United States Patent
Mohindra et al.

(10) Patent No.: US 9,298,285 B2
(45) Date of Patent: Mar. 29, 2016

(54) STYLUS TIP SHAPE

(71) Applicant: Wacom Co., Ltd., Saitama (JP)

(72) Inventors: Rishi Mohindra, Milpitas, CA (US);
Oleksandr Hoshtanar, Lviv (UA);
Hans Klein, Pleasanton, CA (US)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 14/227,021

(22) Filed: Mar. 27, 2014

(65) Prior Publication Data

US 2015/0160744 A1   Jun. 11, 2015

Related U.S. Application Data

(60) Provisional application No. 61/912,474, filed on Dec. 5, 2013.

(51) Int. Cl.
*G06F 3/0354* (2013.01)
*G06F 3/041* (2006.01)
*G06F 3/044* (2006.01)
*G06F 3/038* (2013.01)

(52) U.S. Cl.
CPC .......... *G06F 3/03545* (2013.01); *G06F 3/044* (2013.01); *G06F 3/0418* (2013.01); *G06F 3/0383* (2013.01)

(58) Field of Classification Search
CPC .... G06F 3/044; G06F 3/03545; G06F 3/0383
USPC .............................. 345/179; 178/18.06, 19.03
See application file for complete search history.

(56) References Cited

U.S. PATENT DOCUMENTS

| | | | | |
|---|---|---|---|---|
| 2,003,929 A | * | 6/1935 | Fischel et al. | 33/333 |
| 4,550,257 A | * | 10/1985 | Binnig et al. | 250/492.2 |
| 4,747,216 A | * | 5/1988 | Kelly et al. | 33/366.14 |
| 4,955,232 A | * | 9/1990 | Lautzenhiser et al. | 73/382 G |
| 5,117,071 A | * | 5/1992 | Greanias et al. | 345/178 |
| 5,414,227 A | * | 5/1995 | Schubert et al. | 345/179 |
| 5,627,348 A | | 5/1997 | Berkson et al. | |
| 5,877,459 A | * | 3/1999 | Prater | 178/19.06 |
| 6,175,773 B1 | * | 1/2001 | Reiffel et al. | 700/56 |
| 6,626,598 B2 | | 9/2003 | Schneider | |

(Continued)

FOREIGN PATENT DOCUMENTS

| CN | 202795252 U | 3/2013 | | |
|---|---|---|---|---|
| JP | 1998-230774 A | * | 8/1998 | G01C 5/00 |

(Continued)

OTHER PUBLICATIONS

Hayt, William H. Jr., Engineering Electromagnetics, McGraw Hill, 4th Ed. 1981, p. 178-184.*

(Continued)

*Primary Examiner* — Michael J Eurice
(74) *Attorney, Agent, or Firm* — Seed IP Law Group PLLC

(57) ABSTRACT

Stylus tip configurations may reduce shadow effect of the stylus tip on capacitance measurements by reducing capacitive coupling between undesired portions of the stylus tip and the capacitive sensing surface. Additionally signal-to-noise ratio (SNR) of a stylus on a plurality of capacitance sensing electrodes may be improved by reducing the self capacitance between the stylus tip and the receive electrodes of a mutual capacitance touch screen.

19 Claims, 10 Drawing Sheets

(56) References Cited

U.S. PATENT DOCUMENTS

| | | | |
|---|---|---|---|
| 7,084,860 B1* | 8/2006 | Jaeger et al. | 345/173 |
| 8,125,469 B2 | 2/2012 | Badaye et al. | |
| 8,648,837 B1* | 2/2014 | Tran et al. | 345/179 |
| 2001/0009416 A1* | 7/2001 | Robb | 345/179 |
| 2002/0057261 A1* | 5/2002 | An et al. | 345/179 |
| 2003/0023192 A1* | 1/2003 | Foxlin | 600/595 |
| 2003/0132923 A1* | 7/2003 | Hu | 345/179 |
| 2004/0044273 A1* | 3/2004 | Keith et al. | 600/300 |
| 2005/0126024 A1* | 6/2005 | Kunzi et al. | 33/366.16 |
| 2005/0162411 A1* | 7/2005 | Berkel van | 345/179 |
| 2007/0021687 A1* | 1/2007 | Keith et al. | 600/587 |
| 2007/0245578 A1* | 10/2007 | Clark et al. | 33/365 |
| 2008/0135412 A1* | 6/2008 | Cortenraad et al. | 204/554 |
| 2009/0135149 A1* | 5/2009 | Taniuchi | 345/173 |
| 2009/0309854 A1* | 12/2009 | Hildebrandt et al. | 345/179 |
| 2010/0006350 A1* | 1/2010 | Elias | 178/18.06 |
| 2011/0048039 A1* | 3/2011 | Kohavi et al. | 62/93 |
| 2011/0179657 A1* | 7/2011 | Ozawa | 33/377 |
| 2011/0298709 A1* | 12/2011 | Vaganov | 345/158 |
| 2011/0304577 A1* | 12/2011 | Brown et al. | 345/174 |
| 2012/0050207 A1* | 3/2012 | Westhues et al. | 345/174 |
| 2012/0154340 A1* | 6/2012 | Vuppu et al. | 345/179 |
| 2012/0194484 A1 | 8/2012 | Lehman | |
| 2012/0228039 A1* | 9/2012 | Hinson et al. | 178/19.03 |
| 2012/0274680 A1* | 11/2012 | Hofman | 346/139 C |
| 2012/0299931 A1* | 11/2012 | Monahan | 345/441 |
| 2012/0327041 A1* | 12/2012 | Harley et al. | 345/179 |
| 2012/0327042 A1* | 12/2012 | Harley et al. | 345/179 |
| 2013/0002606 A1 | 1/2013 | Mann | |
| 2013/0106717 A1* | 5/2013 | Sundara-Rajan et al. | 345/173 |
| 2013/0194242 A1* | 8/2013 | Park et al. | 345/179 |
| 2013/0199311 A1* | 8/2013 | Horie et al. | 73/862.626 |
| 2013/0234999 A1* | 9/2013 | Kuno | 345/179 |
| 2013/0249870 A1* | 9/2013 | Slaby et al. | 345/179 |
| 2013/0265265 A1* | 10/2013 | Stern | 345/173 |
| 2013/0269446 A1* | 10/2013 | Fukushima et al. | 73/818 |
| 2013/0271434 A1* | 10/2013 | King-Smith et al. | 345/179 |
| 2014/0078070 A1* | 3/2014 | Armstrong-Muntner | 345/173 |
| 2015/0309598 A1* | 10/2015 | Zeliff | G06F 3/044 345/179 |

FOREIGN PATENT DOCUMENTS

| | | |
|---|---|---|
| KR | 20040057782 | 7/2004 |
| KR | 20130008805 | 1/2013 |
| WO | 2005059734 A2 | 6/2005 |
| WO | 2013183181 A1 | 12/2013 |

OTHER PUBLICATIONS

Hayt, William H. Jr. Engineering Electromagnetics, 4th Edition 1981, McGraw Hill, p. 178-184.*
Severson, Todd, "Maintaining User Experience as Touchscreens Grow," Cypress Semiconductor White Paper, Oct. 2013; 8 pages.
International Search Report for International Application No. PCT/US14/64593 dated Jan. 22, 2015; 3 pages.
Written Opinion of the International Searching Authority for International Application No. PCT/US14/64593 mailed Jan. 22, 2015; 6 pages.

* cited by examiner

STYLUS TIP SHAPE

This application claims the benefit of U.S. Provisional Application No. 61/912,474, filed on Dec. 5, 2013, which is incorporated by reference herein in its entirety.

TECHNICAL FIELD

This disclosure relates to the field of touch-sensors and, in particular, stylus pen tip shapes and constructions.

BACKGROUND

The use of a stylus with a touch screen interface is well established. Touch screen designs have incorporated many different technologies including resistive, capacitive, inductive, and radio frequency sensing arrays. Resistive touch screens, for example, are passive devices well suited for use with a passive stylus. The original PalmPilots® devices from the mid-1990s were one of the first successful commercial devices to utilize a resistive touch screen designed for use with a stylus and helped to popularize that technology. Although resistive touch screens can sense the input from nearly any object, multi-touch is generally not supported. An example of a multi-touch application may be applying two or more fingers to the touch screen. Another example may be inputting a signature, which may include simultaneous palm and stylus input signals. Due to these and other numerous disadvantages, capacitive touch screens are increasingly replacing resistive touch screens in the consumer marketplace.

Various capacitive stylus approaches have been implemented for use with touch screens and are found in many consumer applications such as point-of-sale terminals (e.g., the signature pad used for credit card transactions in retail stores) and other public uses. However, any type of capacitive stylus can be affected by the shadow effect which occurs to some degree at any non-perpendicular angle between the stylus and sensing area. The shape of the tip of the stylus as well as the materials used in its construction may exacerbate or mitigate this shadow effect.

FIG. 1 illustrates one embodiment 100 of a bullet-shaped stylus tip 103. Passive styluses usually have a tip shape that is similar to the point of a ball point pen. The entire tip of the stylus (the body of the tip) is made of a conductive material and it is that conductive material that affects the measured capacitance of the touchscreen and provides the location of the stylus. The user of a stylus, or a normal ball point pen, rarely holds the stylus vertically or perpendicular to the sensing surface. Rather, the pen and the tip are tilted toward the sensing surface, usually between 10 and 45 degrees. Different usage paradigms may lead to angles greater than or less than this range. As the stylus tilts toward the sensing surface, the reported position 144 moves away from the point of contact 142 between the stylus tip 103 and the sensing surface 110 in the direction of the tilt. The offset 143, the reported position 144 versus the point of contact 142, is attributed to the "shadow" of the stylus and may be greater than or equal to 1 millimeter. Such a disparity between the reported position 144 and the point of contact 142 may cause the stylus not to function as required by the program for which its use is intended. The "shadow" of the stylus is caused by the conductive tip of a bullet-shaped stylus having more capacitive coupling with the capacitance sensing electrodes in the direction of the tilt than with the capacitance sensing electrodes in the opposite direction. This phenomenon can be seen for both self-capacitance and mutual-capacitance touch screens.

Another artifact of the bullet-shaped stylus tip is high self-capacitive coupling to the receive electrodes of a mutual-capacitance touch screens. Higher self capacitance coupling for the stylus tip to the receive electrodes of a mutual capacitance touchscreen may reduce the signal to noise ratio (SNR) according to Equation 1:

$$SNR = \frac{\Delta C_m}{C_{f-rx}} \quad (1)$$

where $\Delta C_m$ is the change in mutual capacitance that is caused by the presence of the stylus tip and $C_{f-rx}$ is the self capacitance of the stylus tip to the receive electrodes of the mutual capacitance sensing array. By reducing the SNR of the stylus on the mutual capacitance sensing array, sensitivity of the sensing array to the stylus tip and by extension the usability of the stylus may be impacted.

FIG. 2 illustrates the field magnitude of a bullet-shaped stylus tip when it is in contact with a sensing surface. Longer, bolder arrays indicate greater field magnitude and greater capacitive coupling between the stylus tip and the sensing surface. Smaller, fainter arrows indicate lesser field magnitude and reduced capacitive coupling. An absence of arrows from the stylus to the sensing surface indicates an electric field small enough not to register during capacitance sensing. While there is some coupling in the direction opposite the tilt of the stylus tip, the magnitude of the electric field and the capacitive coupling between the stylus tip and the sensing surface is highest in the direction of the tilt. The increase in the magnitude of the electric field in the direction of the tilt versus the opposite direction causes the self capacitive coupling to the receive electrodes and the "shadow" effect, reducing SNR and causing the offset between the reported position and the actual position.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

The principles of passive stylus operation are well described in U.S. Pat. No. 8,508,510, which is herein incorporated by reference. The principles of mutual capacitance sensing are well described in U.S. Pat. No. 8,358,142, which is herein incorporated by reference. Sensor constructions for use with a passive stylus are well described in U.S. Pat. Nos. 5,374,787, 8,482,546, and 8,484,838, and U.S. patent application Ser. No. 13/008,014, which are all herein incorporated by reference. The listed patents and patent applications are presented as examples of the principles of operation. Different overall stylus configurations and constructions may be used in combination with the embodiments describe herein to achieve the desired result.

There are many methods by which capacitance may be measured, the mutual and self capacitance patents and applications listed above are merely exemplary and are not intended to limit the application of the embodiments of the present application to specific sensing methodologies described therein. Sensor constructions are similarly varied and may be altered to conform to specific product design requirements. The patterns disclosed in the patents and applications listed above are not intended to be a comprehensive list of all patterns for use with passive styluses. Rather, they are merely an exemplary list provided for context.

Figure 1:
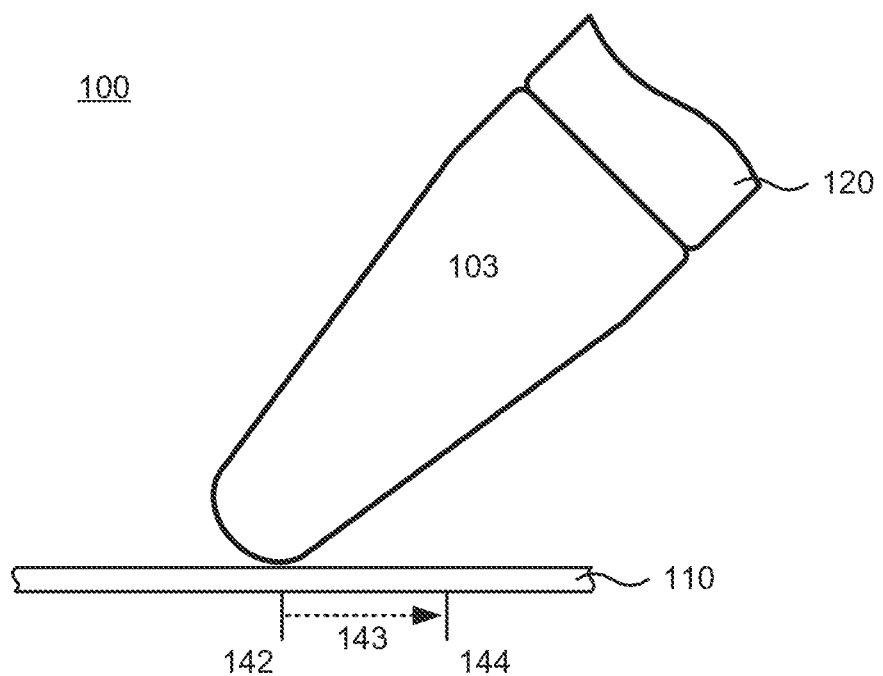
FIG. 1 illustrates a bullet-shaped stylus tip and the position offset caused by suboptimal field density.
Figure 2:
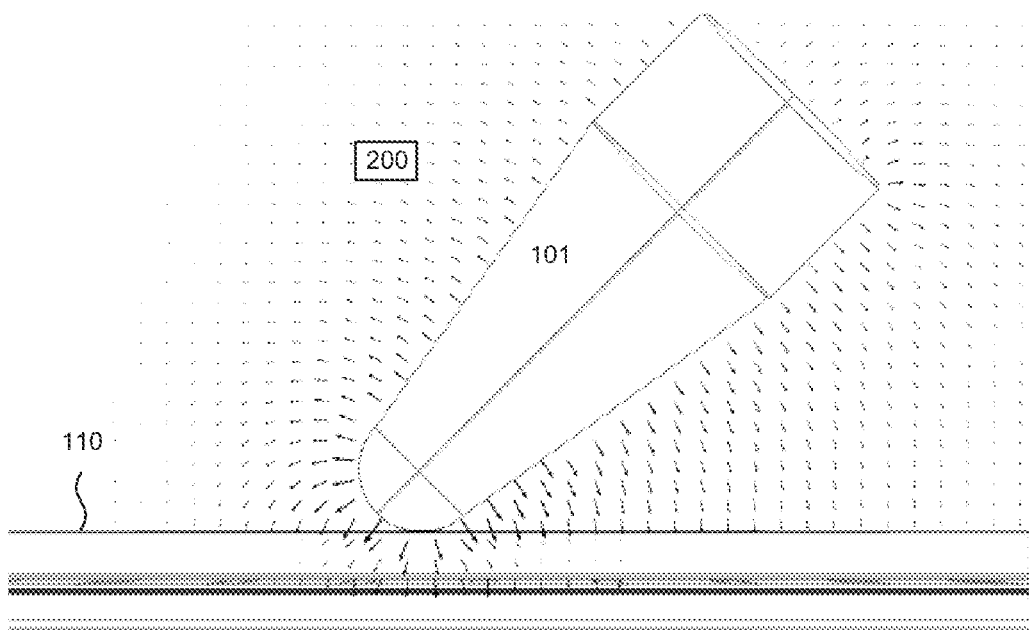
FIG. 2 illustrates field density of a bullet-shaped stylus tip.
Figure 3A:
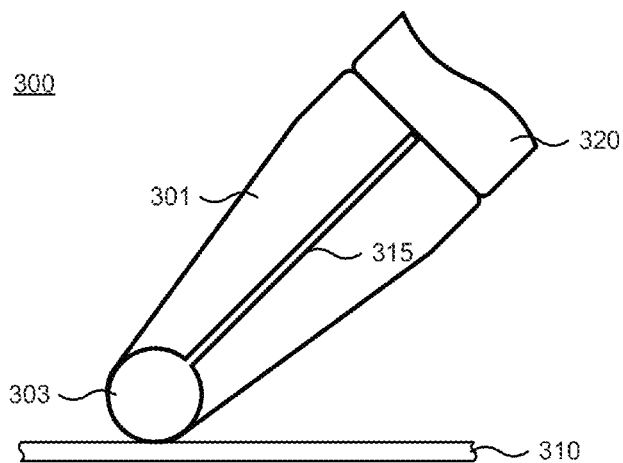
FIG. 3A illustrates a ball stylus tip according to one embodiment of the present invention.

FIG. 3A illustrates a stylus 300 according to one embodiment of the present invention. In this embodiment, the stylus may comprise of a non-conductive dielectric material 301 to form the body of the stylus tip (with a similar shape to the bullet-shaped stylus tip 100 of FIG. 1). At the very tip of the stylus may be disposed a conductive stylus tip 303 which may be coupled to the shaft or body of the stylus 320, some other conductive material, or the user (not shown) by a thin conductive material or wire 315. The stylus 300 may have a smaller capacitive footprint on the sensing surface 310 than the bullet tip stylus 100 illustrated in FIG. 1 and FIG. 2.

Figure 3B:
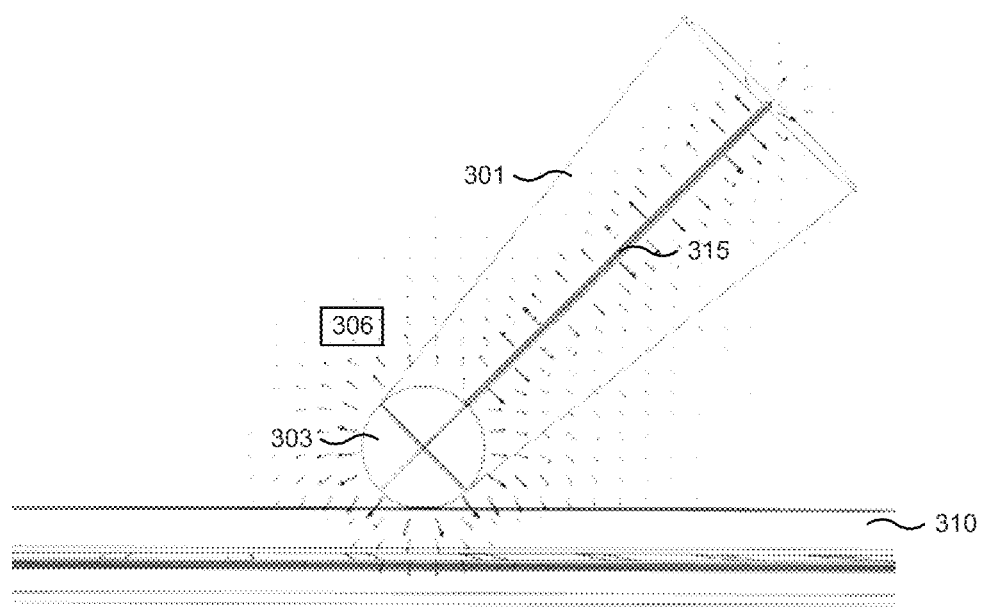
FIG. 3B illustrates field density of a ball stylus tip according to one embodiment of the present invention.

FIG. 3B illustrates an example of a field magnitude 306 of the stylus 300 when it is in contact with a sensing surface 310. As compared to the bullet-shaped stylus tip of FIGS. 1 and 2, the field magnitude 306 of the stylus 300 is only great at the very tip and along the wire 315 running to the shaft or body of the stylus 320. The field strength is not great enough between the conductive stylus tip 303 and the shaft of the stylus to provide any measurable capacitive coupling with the sensing surface 310. There are many potential benefits to this type of design depending on selection of materials and component dimensions. For example, there may be a lower self capacitive coupling between the stylus tip and the receive electrodes of a mutual capacitance sensing array and increases the SNR (signal to noise ratio) of the stylus. There also may be less shadow effect and offset between the reported and actual positions of the stylus 300 as the capacitive coupling with the sensing surface 310 beyond the immediate area of the conductive stylus tip 303 is functionally negligible.

Figure 4A:
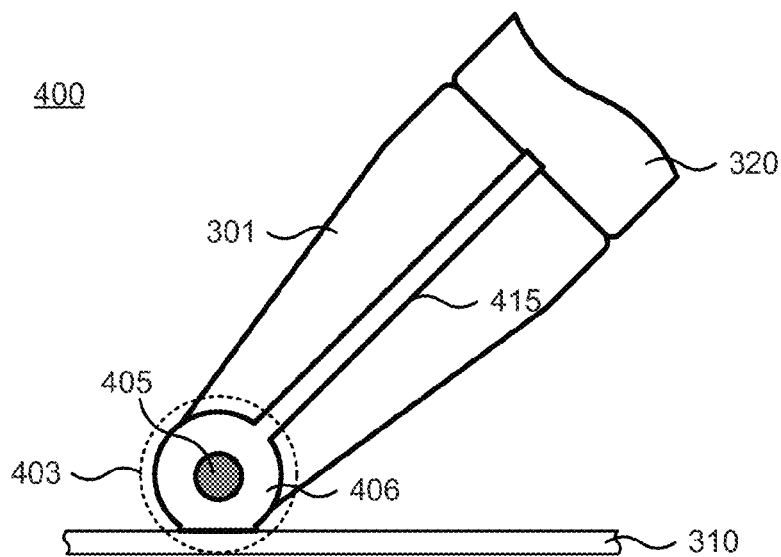
FIG. 4A illustrates a stylus tip according to one embodiment of the present invention.

FIG. 4A illustrates another embodiment of a ball stylus 400 including a "mushy" or flexible material forming a stylus tip 403 connected to the shaft or body of the stylus 320 by a thin conductive material or wire 415. At the core of the stylus tip 403 may be a rigid conductor 405 around which a flexible conductive material 406 may form a larger ball. The rigid conductor 405 may be constructed of standard conductive materials that include but are not limited to copper, stainless steel, or other conductive materials that may be used alone or in combination. The core may be ball-shaped, cubic, cylindrical, conical, or any other shape based on stylus requirements. The flexible portion of the stylus 400 may be constructed by combining (e.g., by infusion) a flexible material, that includes but is not limited to rubber, shielding elastomers (e.g., fluorosilicone), etc. with a conductive material or combination of conductive materials. The flexible portion of stylus 400 may be ball-shaped, cubic, cylindrical, conical, or any other shape based on stylus requirements.

Figure 4B:
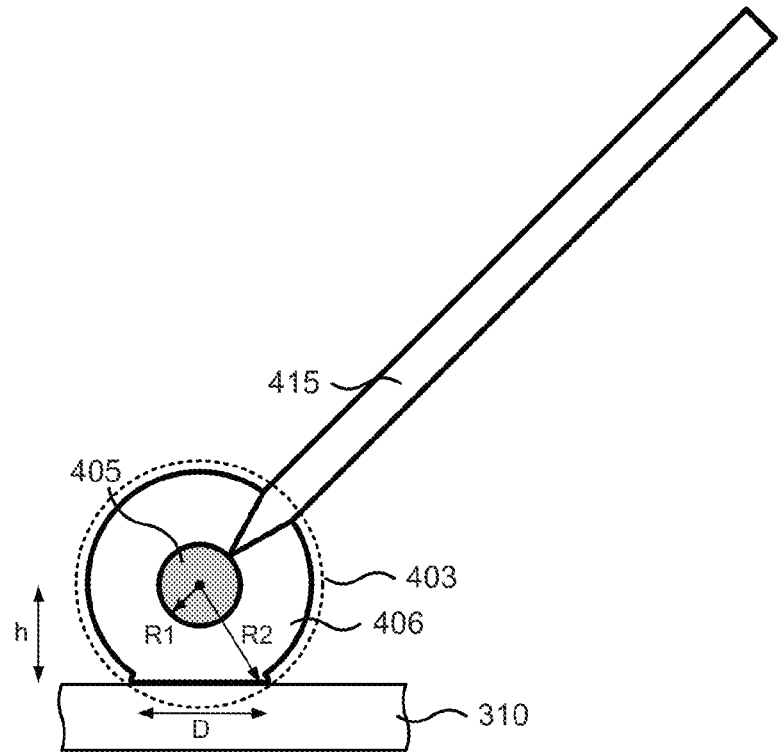
FIG. 4B illustrates mechanical design information for a stylus tip according to one embodiment of the present invention.

FIG. 4B illustrates the mechanical dimensions of one embodiment of the stylus 400. The non-mushy conductor (rigid conductor 405) may have a first radius, R1, and the total stylus tip 403, including the flexible conductive material 406 may have a first radius, R2. In one embodiment, the shadow effect from the stylus body may be effectively limited with a thin conductive material 415 from the rigid conductor 405 to the shaft of the stylus 320 (FIG. 4A) having a length greater than three times the pitch of the sensing electrodes on a diagonal. For example, if the sensing electrodes are disposed on the sensing surface with a pitch of 5 millimeters, the length on the thin conductive material or wire may be greater than 24.3 millimeters.

One advantage of the stylus 400 is that the contact area between the conductive stylus tip 403 of the stylus and the sensing surface 310 is increased as the flexible conductive material 406 deforms with pressure. The area of actual contact between the stylus tip 403 and the sensing surface 310 is no longer a single point, but rather a circle, the diameter of which is given by Equation 2:

$$D = 2\sqrt{R2^2 - h^2} \qquad (2)$$

where R2 is the radius of the sphere of the flexible conductive material 406 and h is the height of the center of the rigid conductor 405 from the sensing surface 310.

Another advantage of the stylus 400 is that a stable touch circle may be created with consistent pressure on the stylus tip, regardless of the angle of the stylus to the sensing surface 310. A stable touch circle may provide greater fidelity in touch location information use the stylus angle changes while writing. Additionally, the change in pressure and the resultant changes in touch circle diameter may provide the operating system with yet another parameter of touch information that to improve the user experience. For example, greater pressure causing a larger diameter touch circle may be used to increase the size of a brush or the contrast of a displayed color versus its surroundings. In another embodiment, the size of the touch circle may provide the ability to require a threshold level of pressure to detect the stylus on the sensing surface at all.

Still another advantage of the stylus 400 is that the flexible conductive material 406 may provide some friction as the stylus moves across the sensing surface 310, creating a writing experience truer to that of a pen or pencil on paper. A completely rigid stylus tip may glide across the sensing surface no or minimal drag. The sensing surface may also be rigid. The lack of drag and force feedback to the user may create a different writing experience than that which the user is accustomed.

The ball tips of FIG. 3 and FIG. 4 (e.g., stylus tip 303/403) are shown to be circular. However, it is not necessary for the ball tip to be a circle. In some embodiments, the tip of the stylus may be an ellipsoid, wherein the long axis may be along the line drawn by the stylus or perpendicular to the line drawn by the stylus. In other embodiments, the ellipsoid may be spherical. In still other embodiments, the axes of the spheroid may not be shared with the shaft of the stylus. In such embodiments, the angles of the ellipsoids may be used to direct the electric field in such a way as to maximize the user experience. In still more embodiments, the ball tip may be an ogive shape. Additionally, the tip of the stylus may not have any round portion at all. In this embodiment, the tips may be square, triangular, or have more complex geometric shapes.

Figure 5A:
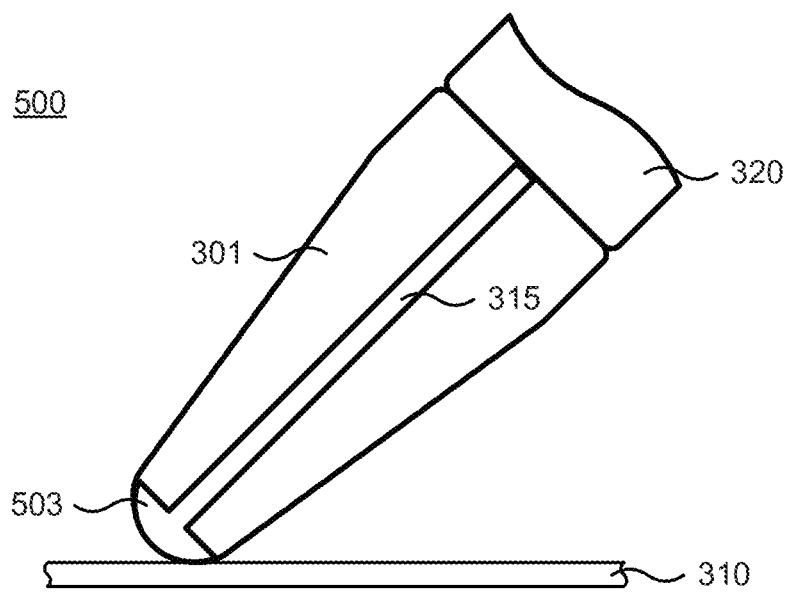
FIG. 5A illustrates a stylus tip according to one embodiment of the present invention.
Figure 5B:
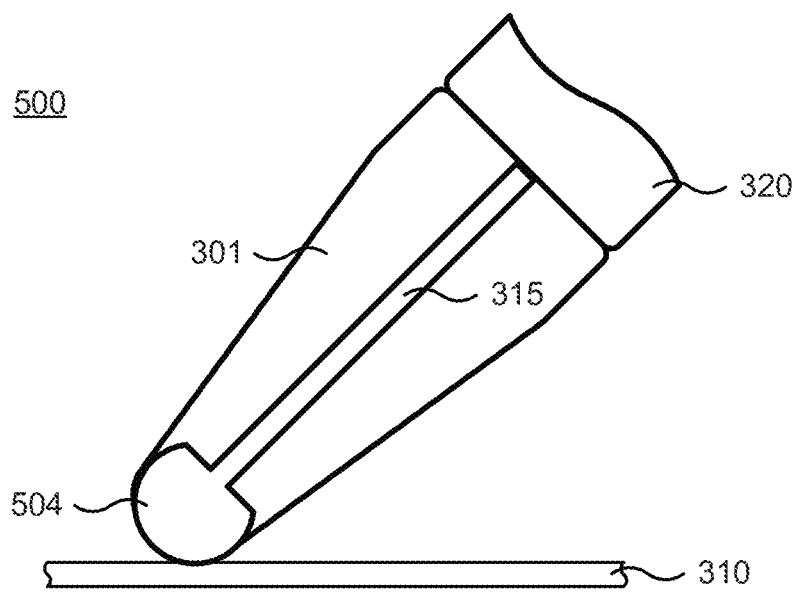
FIG. 5B illustrates a stylus tip according to another embodiment of the present invention.

FIGS. 5A and 5B illustrate another embodiment of a stylus 500 wherein, instead of the stylus tip 303 of FIG. 3A, only a portion of the tip, 503 and 504, is used and connected by a thin conductive material or wire 315 to the shaft or body of the stylus 320. In this embodiment, just as in FIGS. 3A and 4A, the rest of the tip is filled with a non-conductive dielectric material 301 to give the user the common feel of a pen. In this embodiment the conductive tip of the stylus may be even a bare minimum of the stylus tip 503 shown in FIG. 5A or it may be almost the entire ball 504 shown in FIG. 5B.

Figure 6A:
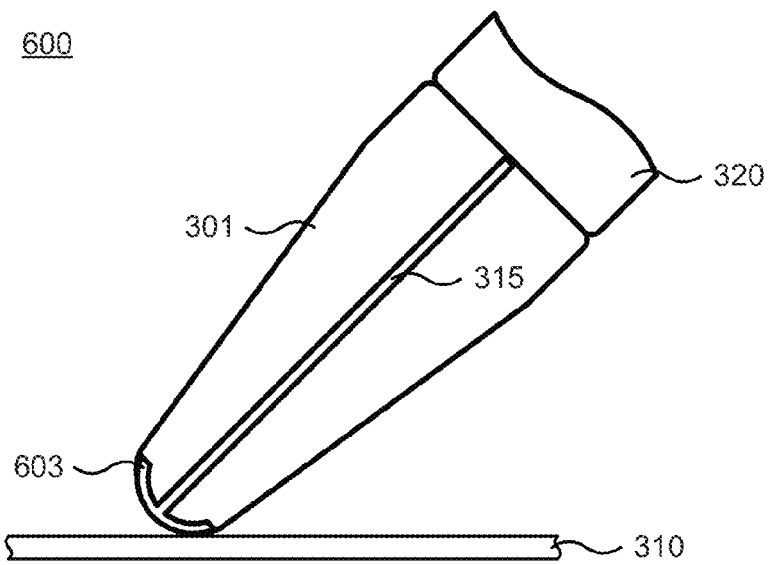
FIG. 6A illustrates a stylus tip according to one embodiment of the present invention.

FIG. 6A illustrates another embodiment of a stylus 600 wherein the portion of the tip used according to FIG. 5 may be hollowed out to create a stylus tip 603 that is umbrella-shaped. The umbrella-shaped portion of the stylus tip 603 may be an ellipsoid cap, the plain of which defines the area of the ellipsoid not included in stylus tip. In one embodiment, the ellipsoid of the ellipsoid cap may be a sphere. The remainder of the stylus tip, just like in FIGS. 3A, 4A, and 5, is filled with a non-conductive dielectric material 301 to give the user the common feel of a pen. In one embodiment of the stylus tip 603, the radius of the sphere may be given by Equation 3:

$$R = \frac{D}{2\sin(Inclination_{MAX} + AngularMargin)} \quad (3)$$

Figure 6B:
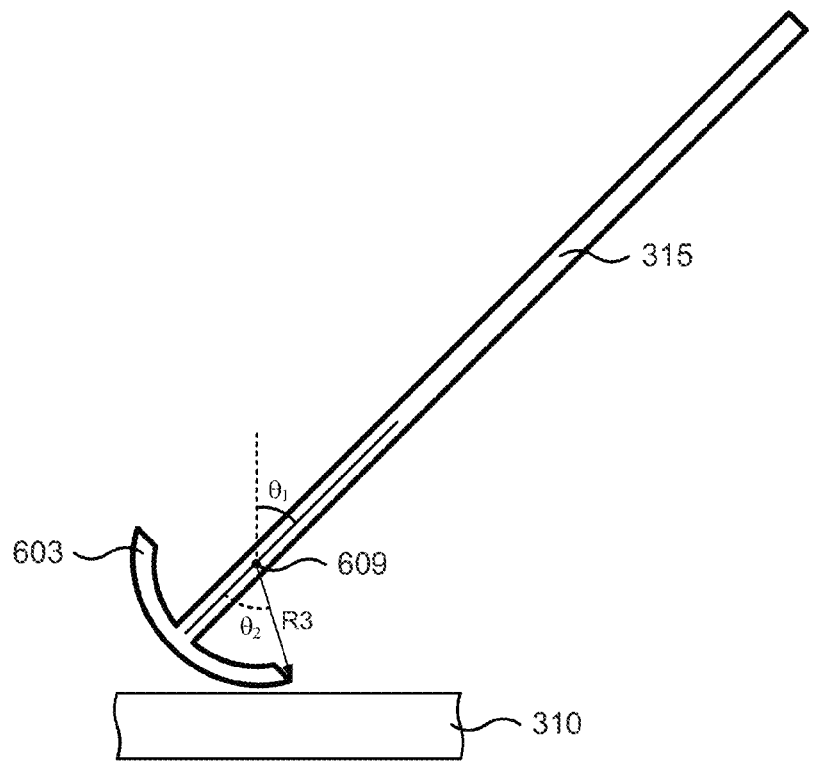
FIG. 6B illustrates mechanical design information for a stylus tip according to one embodiment of the present invention.

FIG. 6B illustrates the dimensions of the stylus tip 603 with a diameter of 2 millimeters. $\theta_1$ is the $Inclination_{MAX}$ of Equation 3 and $\theta_2$ is the $Inclination_{MAX}$ plus the AngularMargin. All points are taken from the center of the circle 609 defined by the umbrella-shaped stylus tip 603.

Figure 6C:
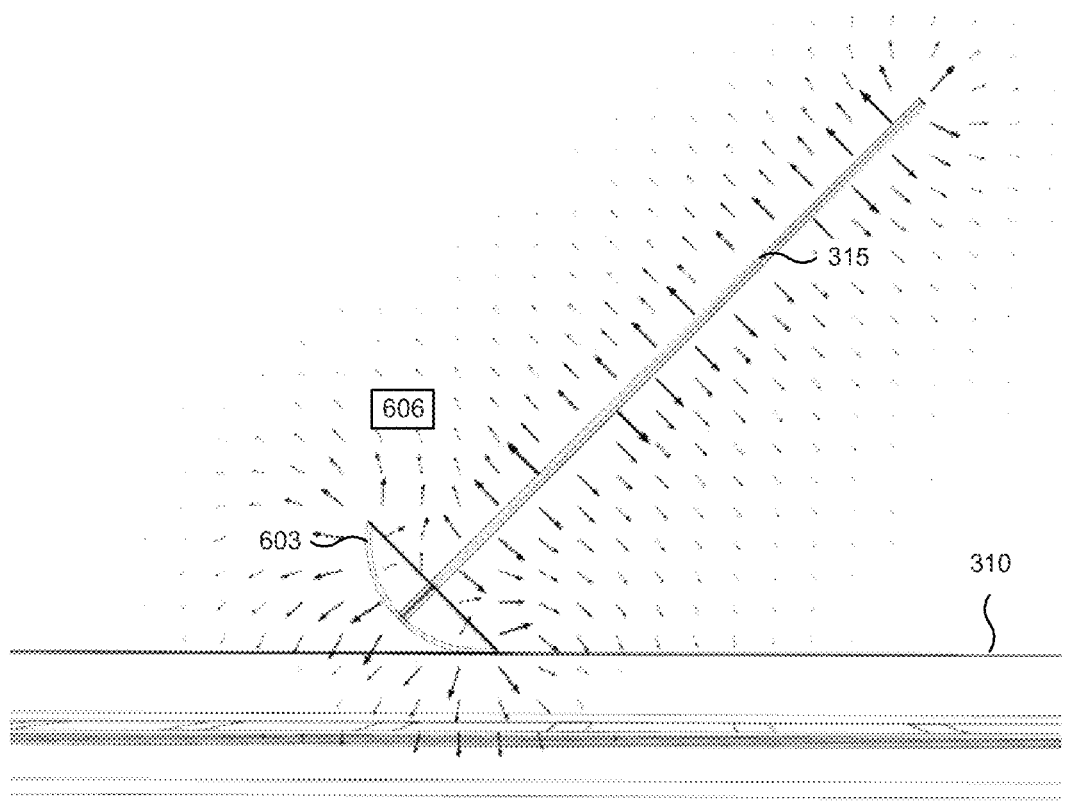
FIG. 6C illustrates field density of an stylus tip according to one embodiment of the present invention.

FIG. 6C illustrates the field magnitude 606 of stylus tip 603 when it is in contact with a sensing surface 310. As opposed to the stylus tip 303 of FIG. 3B, the field lines from the stylus tip 603 project forward as well as in the direction of the tilt. In some embodiments, this projection may provide a forward shadow effect, creating a position offset that is opposite the direction of the tilt of the stylus. This may be useful when the cursor location at which the stylus tip is located would normally be obscured with other stylus tip constructions. With the stylus tip 603, the cursor location may be projected forward so that the pixels in question are visible to the user, enhancing the experience and the usability of the touchscreen.

Figure 7A:
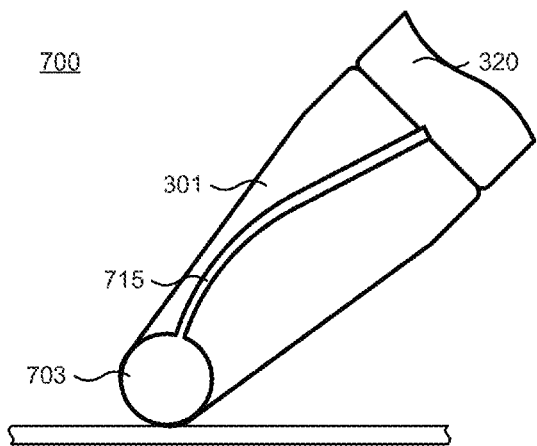
FIGS. 7A and 7B illustrate a stylus tip with a curved connector according to one embodiment of the present invention.
Figure 7B:
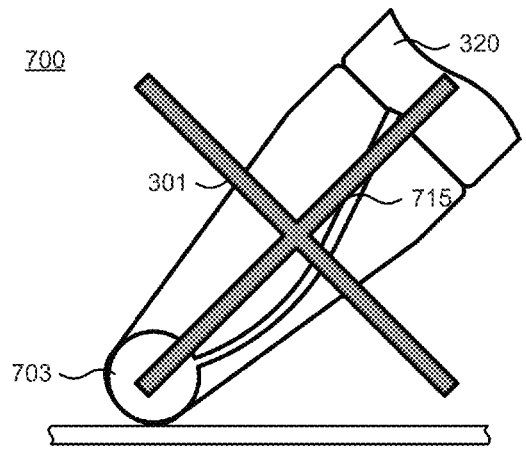

FIG. 7A illustrates one embodiment of a stylus 700, wherein the thin conductive material or wire 715 is curved away from the sensing surface 310 rather than a straight line through the center of the non-conductive dielectric material 301. With a curved connector to the ball tip, the shadow effect, even from the thin conductive material may be reduced and an even truer position of the tip 700 on the sensing surface 310 reported. Of note, it may be necessary to have a directional stylus to ensure that the curve of the thin conductive material is away from the sensing surface, a shown in FIG. 7B. The arc of the curved connection may be constrained by the distance between the main stylus body (shaft) 320 and stylus tip 703. In one embodiment, the arc may be a constant curve. In another embodiment, the arc may leave stylus tip 703 abruptly and travel along the dorsal side of the stylus 700 until it reaches the stylus body 320. The construction of the curve of the stylus tip 703 may be changed to suit the specific needs of the capacitance sensing system, the stylus construction, or other factors of the overall design.

Figure 8:
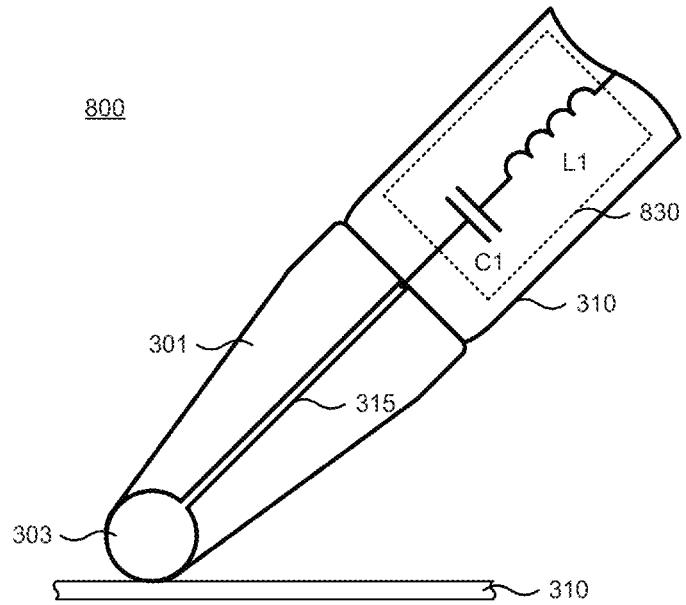
FIG. 8 illustrates a stylus tip with a serial LC filter according to one embodiment of the present invention.

FIG. 8 illustrates one embodiment of a stylus 800, wherein a serial LC circuit (LC filter 830) is disposed between the conductive stylus tip 303 and the connection to the shaft or body of the stylus 320. In this embodiment, at a fixed transmit frequency of the mutual capacitance touchscreen equal to the LC resonance frequency, the effective impedance from the tip to the users hand is zero. The LC filter 830 may have high impedance for frequencies not equal to the transmit frequency of a mutual capacitance touch screen, which may reduce the coupling of noise from other sources into the receive electrodes of the mutual capacitance sensing array. The total frequency response of the LC filter may include the mutual, self, and parasitic capacitances of the stylus to the capacitance sensing electrodes of sensing surface 320. The LC filter 830 of FIG. 8 may be used for any stylus tip construction, including the stylus tip 100 of FIG. 1, the stylus 300 of FIG. 3A, the stylus 400 of FIG. 4A, the stylus 500 of FIGS. 5A and 5B, the stylus 600 of FIG. 6A, or stylus 700 of FIG. 7A. Other stylus configurations may also be used, though not shown here.

Figures 9A, 9B:
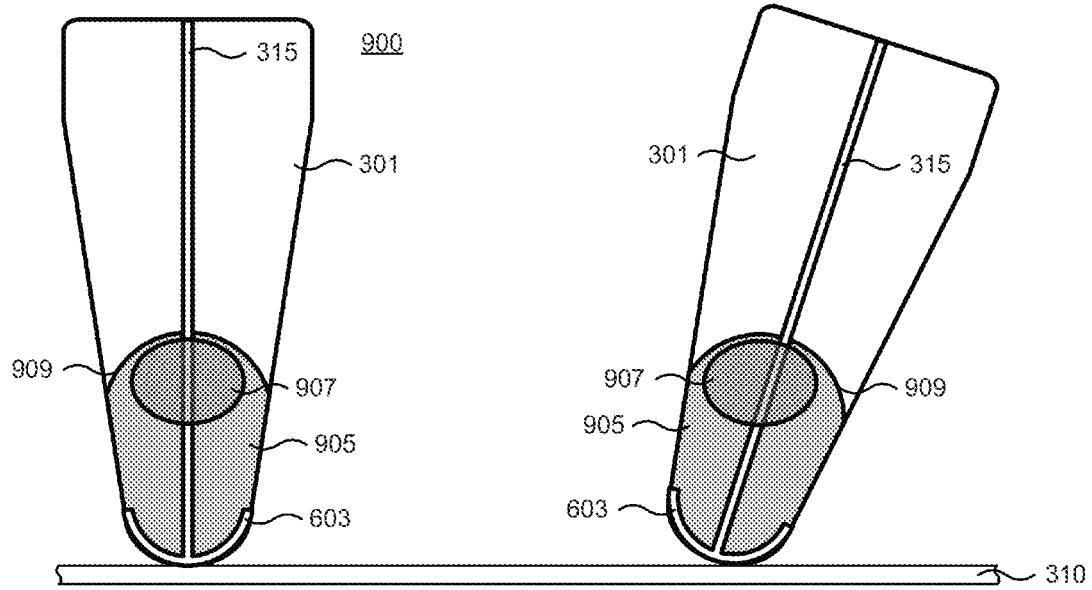
FIGS. 9A through 9C illustrates an stylus tip and comprising a conductive liquid according to one embodiment of the present invention.
Figure 9C:
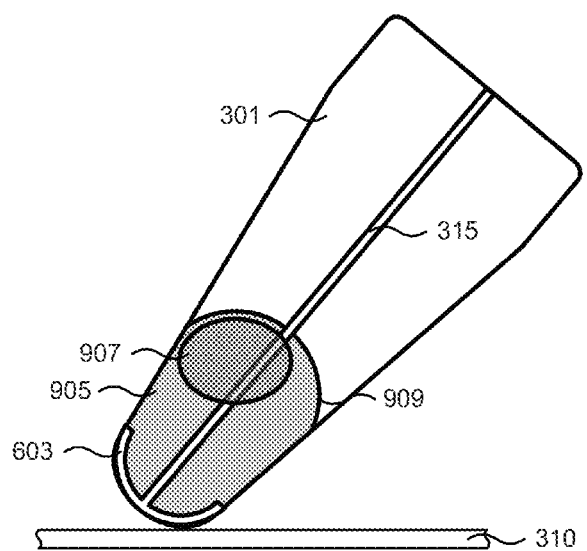

FIGS. 9A through 9C illustrate an embodiment of a stylus 900 with a dielectric 905 and a float 907 at various angles relative to the sensing surface 310. In stylus 900 of FIGS. 9A through 9C, the stylus may comprise a vessel 909 that is filled with the dielectric 905. Vessel 909 may be formed by a barrier within the stylus in one embodiment. In another embodiment, vessel 909 may be formed separately and inserted into stylus 900. In still another embodiment, vessel 909 may be integrated into the construction of stylus 900 such that it is a single mechanical unit. Examples of dielectric liquids include oils, a gas, or ethylene glycol, though other dielectric liquids may be used. Inside the vessel 909 that is filled with the dielectric liquid may be disposed a float 907 that has a shell made of conductive material. Float 907 may be lighter than dielectric 905 and is therefore always at the highest point of the vessel. In other words, the density of float 907 may be less than that of dielectric 905. As the stylus tilts (FIGS. 9B and 9C) float 907 may move within the vessel. As float 907 moves inside the vessel, the shadow effect is shifted as well and the offset (143 of FIG. 1) between the reported position 144 and the point of contact 142 reduced. In one embodiment, the upper boundary of the vessel 909 may be formed such that float 907 moves to one side or the other of the stylus tip with even the slightest angle. In another embodiment, the upper boundary of the vessel 909 may provide a more subtle response to stylus angle.

While float 907 has been described as a solid object, float 907 may also be an air bubble or a conductive liquid. In one embodiment, float 907 may be a hollow conductor. In still another embodiment, float 907 may be a gas with a dielectric constant chosen to reduce the shadow effect of the stylus tip. Any movement of float 907 may cause a shift in the shadow effect. Furthermore, while float 907 is shown to be an ellipsoid shape, other shapes, such as a cube or diamond, may be used.

Figure 10:
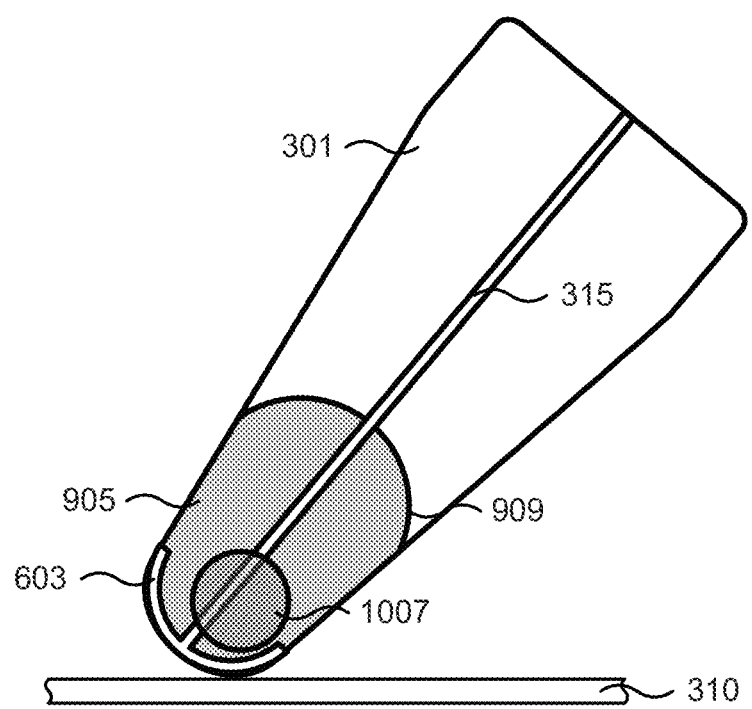
FIG. 10 illustrates an stylus tip and comprising a conductive liquid according to one embodiment of the present invention.

FIG. 10 illustrates an embodiment of stylus 1000 with a dielectric 905 and a sink 1007. Stylus 1000 may comprise a vessel 909 that is filled with a dielectric liquid 905. Sink 1007 may be heavier than dielectric liquid 905 and is therefore always at the lowest point of the vessel. In other words, the density of sink 1007 may be greater than that of dielectric liquid 905. As the stylus tilts sink 1007 may move within the vessel.

While float 907 of stylus 900 and sink 1007 of stylus 1000 are shown in vessel 909 with an umbrella-shaped stylus tip (stylus tip 603 of FIG. 6), any stylus tip may be used with vessel 909.

The stylus tips of the foregoing specification and corresponding figures illustrate the various shapes in physical, electrical contact with the thin conductive material or wire (e.g., 315). In other embodiments, the thin conductive material or wire may be formed from the same material as the conductive stylus tip and in the same process such that the thin conductive material and the conductive stylus tip are electrically and physically the same, but with different portions according the figures of the foregoing specification. In another embodiment, the conductive stylus tip and the thin conductive material may be electrically distinct such that the coupling between them is capacitive. In this embodiment, the conductive stylus tip may be capacitively coupled to the thin conductive material, which is then coupled to the body of the stylus. In another embodiment, the thin conductive material may be electrically coupled to the body of the stylus or it may be capacitive coupled thereto.

Additionally, while the various tip shapes of the foregoing specification and corresponding figures have been illustrated as having at least a portion exposed to the sensing surface (not covered by the dielectric material), in some embodiments the entire conductive element of the stylus tip may be inside the dielectric material or coated with a thin dielectric covering. In these embodiments, the conductive element and the sensing surface may be protected from each other. Capacitive coupling between the electrodes of the sensing surface and the stylus may still exist though a thin dielectric covering.

In the foregoing specification and figures, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A stylus tip of a stylus comprising:
a first conductive element coupled to a second conductive element and collectively configured to resemble an umbrella shape, wherein:
the first conductive element is disposed substantially at a point of contact between the stylus tip and a capacitive sensing surface, wherein the first conductive element includes a convex surface facing the capacitive sensing surface and a concave surface facing away from the capacitive sensing surface, and is configured to produce a field distribution having a greater density at locations substantially opposite a tilt direction of the stylus and independent of the axial rotation of the stylus, and
the second conductive element is configured to couple the first conductive element at the concave surface of the first conductive element to a body of the stylus, wherein the second conductive element is elongated and is substantially narrower than the first conductive element; and
a dielectric material disposed directly around the second conductive element, the dielectric material configured to provide a pen shape to the stylus tip.

2. The stylus tip of claim 1, wherein the second conductive element is a wire.

3. The stylus tip of claim 1, wherein the second conductive element includes an arc.

4. The stylus tip of claim 1, wherein a shape of a cross section of the first conductive element perpendicular to the axis of the stylus is an ellipse or a circle.

5. The stylus tip of claim 1, wherein the second conductive element is electrically connected to the first conductive element.

6. The stylus tip of claim 1, further comprising a conductive float, and wherein the dielectric material is a liquid disposed within a vessel, the vessel having a shape to provide a pen shape to the stylus tip.

7. The stylus tip of claim 1, wherein the dielectric material is disposed at least within a volume contained within the concave surface of the first conductive element the and in direct contact with the concave surface.

8. The stylus tip of claim 1, wherein the first conductive element comprises:
a rigid conductor coupled to the second conductive element; and
a flexible conductor disposed substantially surrounding the rigid conductor, the flexible conductor configured to deform against the capacitive sensing surface by an application of pressure.

9. The stylus tip of claim 8, wherein the flexible conductor is configured to form a contact circle on the capacitive sensing surface, the contact circle having a diameter proportional to a force applied to the stylus tip.

10. The stylus tip of claim 8, wherein the second conductive element has a length equal to at least three times a width of the first conductive element.

11. A stylus tip of a passive stylus comprising:
a first conductor coupled to a second conductor and collectively configured to resemble an umbrella shape, wherein:
the first conductor is configured to capacitively couple to a plurality of mutual capacitance sensing electrodes disposed on a sensing surface, wherein the first conductor includes a convex surface facing the sensing surface and a concave surface facing away from the sensing surface and is configured to produce a field distribution having a greater density at locations substantially opposite a tilt direction of the stylus and independent of the axial rotation of the stylus;
the second conductor coupled to the first conductor at the concave surface of the first conductor and to the body of the stylus, wherein the second conductor is substantially narrower than the first conductor;

an LC filter coupled between the second conductor and the body of the stylus; and a dielectric material disposed around and in direct contact with the second conductor, the dielectric material configured to provide a pen shape to the stylus tip.

12. The stylus tip of claim 11, wherein the LC filter has a resonance frequency substantially equal to a transmit frequency of a transmit (TX) signal of the mutual capacitance sensing electrodes.

13. The stylus tip of claim 11, wherein the LC filter is configured to have a high impedance for frequencies substantially not equal to a transmit frequency of a transmit (TX) signal of the mutual capacitance sensing electrodes.

14. The stylus tip of claim 11, further comprising a conductive float, and wherein the dielectric material is a liquid disposed within a vessel, the vessel having a shape to provide a pen shape to the stylus tip.

15. The stylus tip of claim 11, wherein the second conductor includes an elongated shape and the dielectric material is disposed directly around an entire length of the second conductor.

16. The stylus tip of claim 11, wherein the LC filter includes a capacitor and an inductor coupled in series between the second conductor and the body of the stylus.

17. A method comprising:
forming a conductive element of a stylus tip, the conductive element comprising:
a first portion coupled to a second portion and collectively configured to resemble an umbrella shape, wherein:
the first portion has a first width, includes a convex surface facing a capacitive sensing surface and a concave surface which facing away from the capacitive sensing surface, and is configured to produce a field distribution having a greater density at locations substantially opposite a tilt direction of the stylus and independent of the axial rotation of the stylus, and
the second portion has a second width substantially smaller than the first width, is coupled to the first portion at the concave surface of the first portion, and is coupled to a body element of the stylus; and
forming a dielectric material around and in direct contact with the second portion of the conductive element, the dielectric material configured to prove a pen shape to the stylus tip.

18. The method of claim 17, wherein forming the first conductive element comprises;
forming a rigid conductor coupled as the first portion of the conductive element; and
forming a flexible conductor around the rigid conductor, the flexible conductor configured to deform against a capacitive sensing surface with the application of pressure to the flexible conductor.

19. The method of claim 17, wherein forming the dielectric material comprises:
forming a vessel around the second portion of the conductive element, the vessel having a shape substantially similar to the shape of a pen and hollow;
disposing a float within the vessel, the float having a first density; and
filling the vessel with a dielectric liquid having a second density, such that the float is configure to move through the dielectric liquid and within the vessel with a change in orientation of the stylus tip.

\* \* \* \* \*